C. L. English,
Bellows.
N° 71,060.   Patented Nov. 19, 1867.
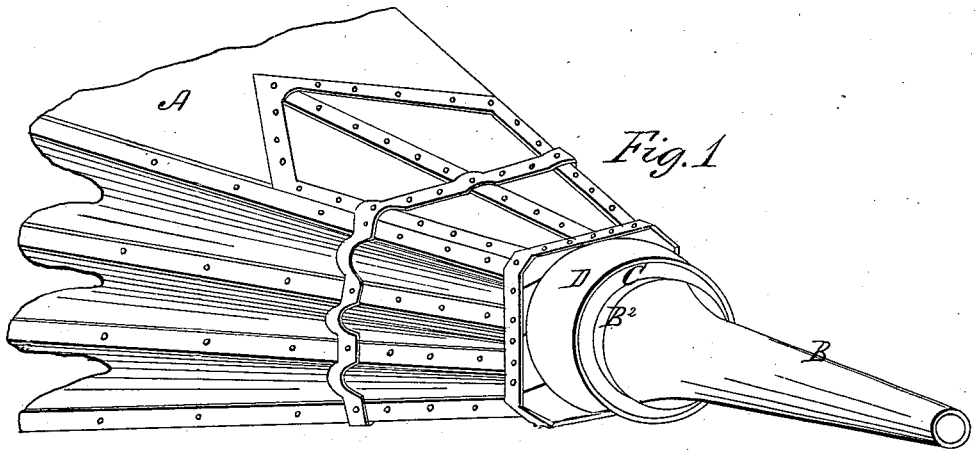
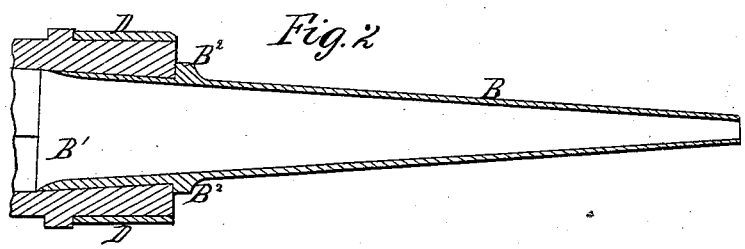

United States Patent Office.

CLEMENT L. ENGLISH, OF CINCINNATI, OHIO.

Letters Patent No. 71,060, dated November 19, 1867.

IMPROVEMENT IN BELLOWS.

*The Schedule referred to in these Letters Patent and making part of the same.*

TO ALL WHOM IT MAY CONCERN:

Be it known that I, CLEMENT L. ENGLISH, of Cincinnati, in the county of Hamilton, and State of Ohio, have invented a new and improved Bellows Pipe; and I do hereby declare the following to be a full, clear, and exact description of the same, reference being had to the accompanying drawings, which are made part of this specification.

This invention relates to an improvement in forge-bellows, and consists in a peculiar construction of the pipe or nozzle, whereby the blast is discharged into the fire. The flaring butt of the pipe is snugly fitted into the wooden socket of the bellows, and this, in connection with an annular flange or collar on the pipe, serves to maintain a tight joint both in use and transportation.

Figure 1 is a perspective view of a portion of a bellows, illustrating my invention.

Figure 2 is a longitudinal section of the pipe and wooden socket.

Similar letters of reference indicate corresponding parts in the two figures.

In the drawings, A represents the bellows, and B the blast pipe thereof; said pipe being made of cast or sheet metal. The flaring or tapering butt $B^1$ (see fig. 2) of the pipe fits snugly within the corresponding wooden socket C, which is made of a plurality of separate pieces, to each of which is hinged one of the boards or flaps of which the bellows is composed. These socket-pieces being fitted and placed around the butt of the pipe, are there held by the band D and other suitable appliances. $B^2$ is an annular flange or collar formed on or applied to the pipe B, and bearing against the outer end of the socket C. This flange serves not only to strengthen the pipe at a point where it is usually liable to bend from wedging, but it maintains a tight joint between the pipe and its socket, preventing the pipe from working loose, and effectually closing the joint against the escape of air.

The above-described provisions, that is to say, the flaring butt and the flange, enable me to furnish a bellows whose pipe will not be impaired by the warping effect of the heat upon the wooden socket, or by transportation or actual use.

Having thus described my invention, what I claim as new herein, and desire to secure by Letters Patent, is—

A bellows, having a pipe with the tapering or flaring butt $B^1$, and shoulder or collar $B^2$, applied and operating in the manner and for the purpose set forth.

To the above specification of my new and improved bellows pipe I have signed my hand this 12th day of July, A. D. 1867.

C. L. ENGLISH.

Witnesses:
OCTAVIUS KNIGHT,
J. E. M. BOWEN.